Nov. 26, 1935.   W. C. ROBERTS   2,022,090
BATTERY CONTAINER
Filed April 18, 1934
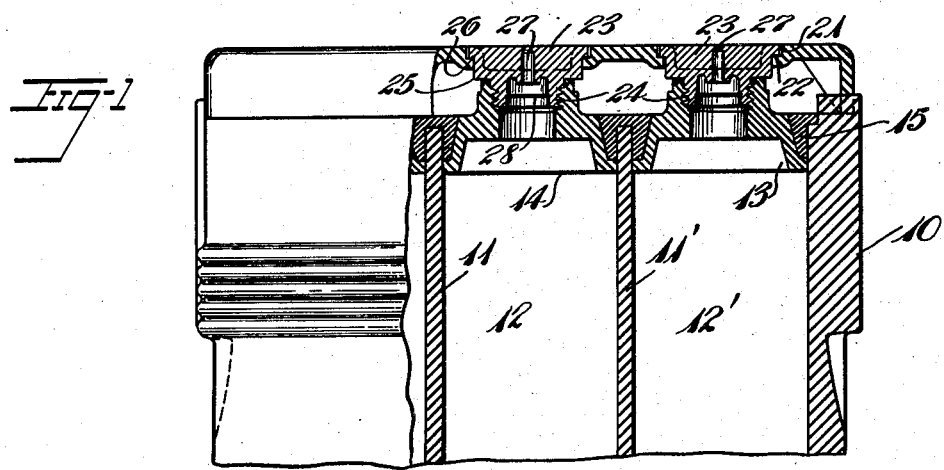
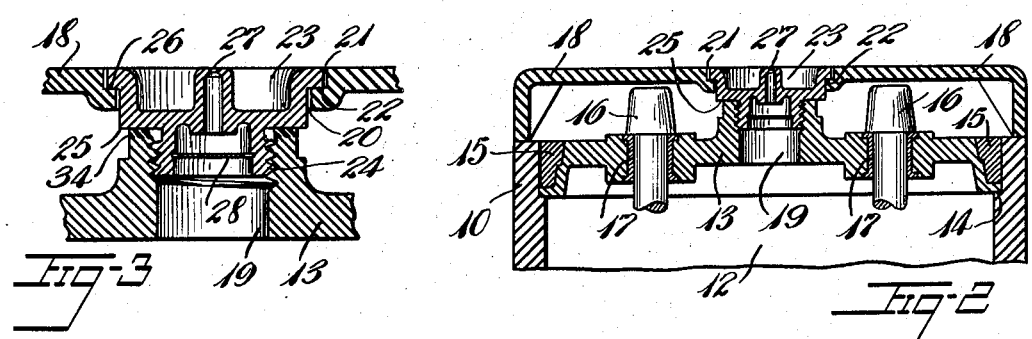
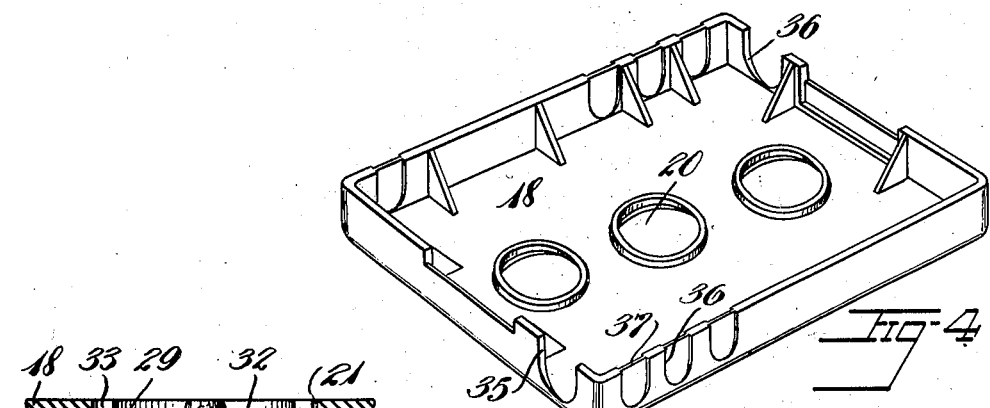
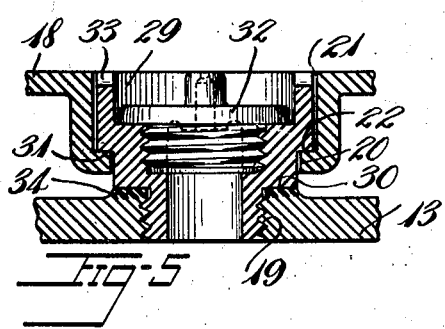
Inventor
Walter C. Roberts
By Eakin & Avery
Attys.

Patented Nov. 26, 1935

2,022,090

UNITED STATES PATENT OFFICE 2,022,090

BATTERY CONTAINER

Walter C. Roberts, Akron, Ohio, assignor to The B. F. Goodrich Company, New York, N. Y., a corporation of New York Application April 18, 1934, Serial No. 721,133

6 Claims. (Cl. 136—170)

This invention relates to battery containers such as are used to enclose the cells of a storage battery or electric accumulator.

Heretofore the tops of the cells have generally been exposed to the atmosphere so that the necessary connections could be made and to permit filling of the cells. The exposure of the connections often results in premature discharge of the battery through contact with tools or parts of the car where the battery is used in an automobile. As the spray of acid during discharging is permitted to escape from vents formed in the filling plugs in close proximity to the unprotected connections, the connections are subjected to corrosion.

While covers have been provided for storage batteries, these have not permitted filling of the cells without their removal so that corrosion of the connections and shorting of the battery was just as possible in the covered battery as in one not covered.

The principal object of the present invention is to provide a structure in which the battery cells are covered, and filling of the cells is permitted without uncovering the connections.

Other objects will appear from the following description and the accompanying drawing.

In the drawing:

Fig. 1 is a side elevation, partly in section, of the upper part of a three cell battery container, without the plates or electrical connections, showing the preferred form of the invention.

Fig. 2 is a vertical sectional view of the same taken on the center line of the terminal posts of one cell.

Fig. 3 is a detail view, drawn to a larger scale, showing the combination filler plug and cover retainer, other parts being broken away.

Fig. 4 is a perspective view of the cover showing the inside thereof.

Fig. 5 is a detail view similar to Fig. 3 but showing a modified form of the device.

Referring to the drawing, the numeral 10 designates a jar moulded from plastic material and preferably of hard rubber composition. It is divided by partitions 11, 11', into a multiplicity of cells 12, 12' adapted to contain the electrolyte and the plates and separators.

A cell cover 13 is provided for each cell and rests on a shoulder 14, contacting with the cell walls at its lower edges but spaced therefrom thereabove to provide space for a seal 15 of fused bituminous material. The cell covers are apertured to receive the terminal lugs 16 to which the plates are attached, a sealing bushing of lead 17 preferably being molded in the plastic material around each aperture and thereafter burned to the lug 16.

In order to protect the connections from accidental shorting and from the charging spray a moulded cover 18 of insulating material such as hard rubber is provided. This cover extends over the entire jar and rests on its upper margins.

In order to provide for ventilation and inspection of the cells, the cell covers 13 are each formed with a filler plug and the cover 18 is formed above each aperture 19 to provide an aperture 20 surrounded by a counterbored cavity 21, terminating in a shoulder 22.

In the preferred form of the device a filler cap 23 is formed with a threaded portion 24 to engage in the aperture 19, a shoulder 25 to impinge against the face of the cell cover 13, and a second shoulder 26, spaced therefrom to engage the shoulder 22 of the jar cover around the aperture 20. The filler cap 23 is as usual provided with a vent opening 27 and a baffle plate 28 to permit passage of air and gases while retaining the acid.

In the modified form of the device, shown in Fig. 5, a shouldered hollow nipple 29 is threaded to engage the cell cover opening 19 and has a shoulder 30 bearing thereagainst and a shoulder 31 spaced therefrom to engage the shoulder 22 of the cover 18 and retain the cover in place. Nipple 29 is internally threaded to receive a filler plug 32 of standard construction. Notches 33 in the nipple permit its being engaged by a spanner wrench.

The shoulder 34 of the cell cover against which either the cap 23 or the nipple 29 impinges is preferably formed of soft rubber vulcanized integrally to the hard rubber cover to provide a tight sealing gasket although a separate soft rubber gasket may be provided if desired. The aperture 21 is made of sufficient depth so that the filler cap does not project above the cover 18.

The cover 18 is formed with notches 35, 36, to admit the terminal cables. The side walls of the cover may be moulded to provide partially formed notches 36 closed by thin frangible partitions 37, which may be broken or cut away when it is desired to provide cable openings. By providing these at a plurality of positions, as shown in Fig. 4, the same cover may be used for different cable arrangements.

As the cell covers are sealed to the jar except at the filler openings and are then sealed to the filler caps or nipples which extend above the jar cover, any acid escaping from the cells is prevented from reaching the connecting straps and cables.

The filler caps serve the purpose of retaining the jar cover and the cells may be inspected, one at a time, while the cover is securely held in place by the other filler caps.

I claim:

1. A battery container comprising a jar adapted to receive the battery elements and the electrolyte, a cell cover sealed and anchored in fixed relation to said jar and formed with a filling aperture, a molded, cup-shaped cover extending over the top of the jar to protect the battery connections, and a combination filler cap and cover retainer extending through and interlocked with the cup-shaped cover and detachably engaged in the filling aperture in the cell cover, the said combination member or a plurality of the same constituting the only means for retaining the connection-protecting cover in place.

2. A battery container comprising a multiple-celled jar to receive the battery elements and the electrolyte, individual cell covers sealed and anchored in fixed relation to each of the cells thereof and formed with filling apertures, a molded, cup-shaped jar cover extending over the top of the jar to protect the battery connections, and a plurality of combination filler caps and cover retainers extending through and interlocked with the cup-shaped cover and detachably engaged in the filling apertures, the said combination members constituting the only means for retaining the connection-protecting cover in place.

3. A battery container comprising a multiple-celled jar to receive the battery elements and the electrolyte, individual cell covers sealed and anchored in fixed relation to each of the cells thereof and formed with threaded filling apertures, the margins around said apertures each having an integral soft rubber facing, a jar cover extending over the top of the jar to protect the battery connections, and a plurality of combination filler caps and cover retainers screwed into the filling apertures and engaging the soft rubber margins of the filler openings in the cell covers and extending through apertures in and rigidly engaging the jar cover.

4. A battery container comprising a multiple celled jar to receive the battery elements and the electrolyte, individual cell covers sealed and anchored in fixed relation to each of the cells thereof and formed with threaded filling apertures, a jar cover adapted to extend over all the cells and formed with apertures aligned with the apertures of the cell covers, said apertures being counterbored to provide inwardly turned margins below the top of the jar cover, and combination filling caps and cover retainers having their upper end portions located entirely in the counterbores of the apertures and engaged in the threaded apertures in the cell covers.

5. A battery container comprising a multiple-celled jar to receive the battery elements and the electrolyte, individual cell covers sealed and anchored in fixed relation to each of the cells thereof and formed with threaded filling apertures, a jar cover adapted to extend over all the cells and formed with apertures aligned with the apertures of the cell covers, said apertures being counterbored to provide inwardly turned margins below the top of the jar cover, shouldered hollow nipples engaged in the threaded apertures of the cell covers and engaging the inwardly turned margins of the jar cover, and filling plugs for closing the openings in the nipples, the said nipples and the said plugs having no portion higher than the adjacent upper surface of the jar cover.

6. A battery container comprising a jar adapted to receive the battery elements and the electrolyte, a cell cover sealed and anchored in fixed relation to said jar and formed with a filling aperture, a jar cover extending over the top of the jar to protect the battery connections, and a combination filler cap and cover retainer extending through and interlocked with the jar cover and detachably engaged in the filling aperture in the cell cover, the said combination member or a plurality of the same constituting the only means for retaining the connection-protecting cover in place.

WALTER C. ROBERTS.